US008456789B2

(12) United States Patent
Van Swearingen et al.

(10) Patent No.: US 8,456,789 B2
(45) Date of Patent: Jun. 4, 2013

(54) TUNABLE COAXIAL SURGE ARRESTOR

(75) Inventors: Kendrick Van Swearingen, Woodridge, IL (US); Albert Cox, Orland Park, IL (US)

(73) Assignee: Andrew LLC, Hickory, NC (US)

( * ) Notice: Subject to any disclaimer, the term of this patent is extended or adjusted under 35 U.S.C. 154(b) by 324 days.

(21) Appl. No.: 12/968,631

(22) Filed: Dec. 15, 2010

(65) Prior Publication Data

US 2012/0154970 A1 Jun. 21, 2012

(51) Int. Cl.
*H02H 3/22* (2006.01)
*H02H 1/04* (2006.01)

(52) U.S. Cl.
USPC ............ 361/111; 361/117; 361/118; 361/119

(58) Field of Classification Search
USPC .................................. 361/111, 117, 118, 119
See application file for complete search history.

(56) References Cited

U.S. PATENT DOCUMENTS 3,193,779 A 7/1965 Beaty
3,289,117 A 11/1966 Kearns et al.
3,663,901 A 5/1972 Forney, Jr.
3,728,650 A * 4/1973 Forman et al. ................ 333/252
4,389,624 A 6/1983 Aihara et al.
4,701,825 A 10/1987 Pagliuca
5,982,602 A 11/1999 Tellas et al.
6,061,223 A 5/2000 Jones et al.
6,101,080 A 8/2000 Kuhne
6,115,227 A 9/2000 Jones et al.
6,236,551 B1 5/2001 Jones et al.
6,452,773 B1 9/2002 Aleksa et al.
6,529,357 B1 3/2003 Landinger et al.
6,636,407 B1 10/2003 Ryman
6,721,155 B2 4/2004 Ryman
7,094,104 B1 8/2006 Burke et al.
7,170,728 B2 1/2007 Mueller
7,324,318 B2 * 1/2008 Harwath et al. .............. 361/119
7,349,191 B2 3/2008 Harwath
7,440,253 B2 * 10/2008 Kauffman ..................... 361/119
7,483,251 B2 1/2009 Davis et al.
7,564,669 B2 7/2009 Kauffman
7,583,489 B2 9/2009 Swearingen
7,609,502 B2 10/2009 Kauffman
7,623,332 B2 11/2009 Frank et al.
7,826,194 B2 * 11/2010 Brand ........................... 361/119
2004/0100751 A1 5/2004 Ammann

* cited by examiner

*Primary Examiner* — Rexford Barnie
*Assistant Examiner* — Zeev V Kitov
(74) *Attorney, Agent, or Firm* — Babcock IP, PLLC

(57) ABSTRACT

A tunable coaxial surge arrestor includes an inner conductor within a bore of an outer body of the coaxial surge arrestor. An inner end of a stub is coupled with the inner conductor. The stub is also coupled with the outer body at a selectable location along the length of the stub.

14 Claims, 20 Drawing Sheets

TUNABLE COAXIAL SURGE ARRESTOR

BACKGROUND OF THE INVENTION

1. Field of the Invention

The invention generally relates to surge protection of coaxial cables and transmission lines. More particularly, the invention relates to a surge arrestor tunable for operation in a range of different frequency bands.

2. Description of Related Art

Electrical cables, for example coaxial transmission lines of antenna towers, are equipped with surge suppression equipment to provide an electrical path to ground for diversion of electrical current surges resulting from, for example, static discharge and/or lightning strikes.

Prior coaxial suppression equipment typically incorporated a frequency selective inductor shorting element between the inner and outer conductors dimensioned to be approximately one quarter of the frequency band center frequency in length, also known as a quarter wavelength stub. Therefore, frequencies within the operating band pass along the inner conductor, reflecting in phase from the quarter wavelength stub back to the inner conductor rather than being diverted to the outer conductor and/or a grounding connection. Frequencies outside of the operating band, such as low frequency surges from lightning strikes, do not reflect and are coupled to ground, preventing electrical damage to downstream components and/or equipment.

U.S. Pat. No. 5,982,602 "Surge Protector Connector" by Tellas et al, issued Nov. 9, 1999 commonly owned with the present application and hereby incorporated by reference in the entirety, is exemplary of prior frequency band specific surge arrestors. Separate design and manufacture is necessary to produce surge arrestors capable of operating at the various typical frequency bands of operation. Each surge arrestor, designed for a particular frequency band, has a specifically dimensioned spiral inductor stub, requiring the separate design and manufacture of multiple coaxial surge arrestor configurations for each of the various frequency bands.

Competition within the electrical cable, connector and associated accessory industries has focused attention on cost reductions resulting from increased manufacturing efficiencies, reduced installation requirements and simplification/overall number of discrete parts reduction.

Therefore, it is an object of the invention to provide an apparatus that overcomes deficiencies in the prior art.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
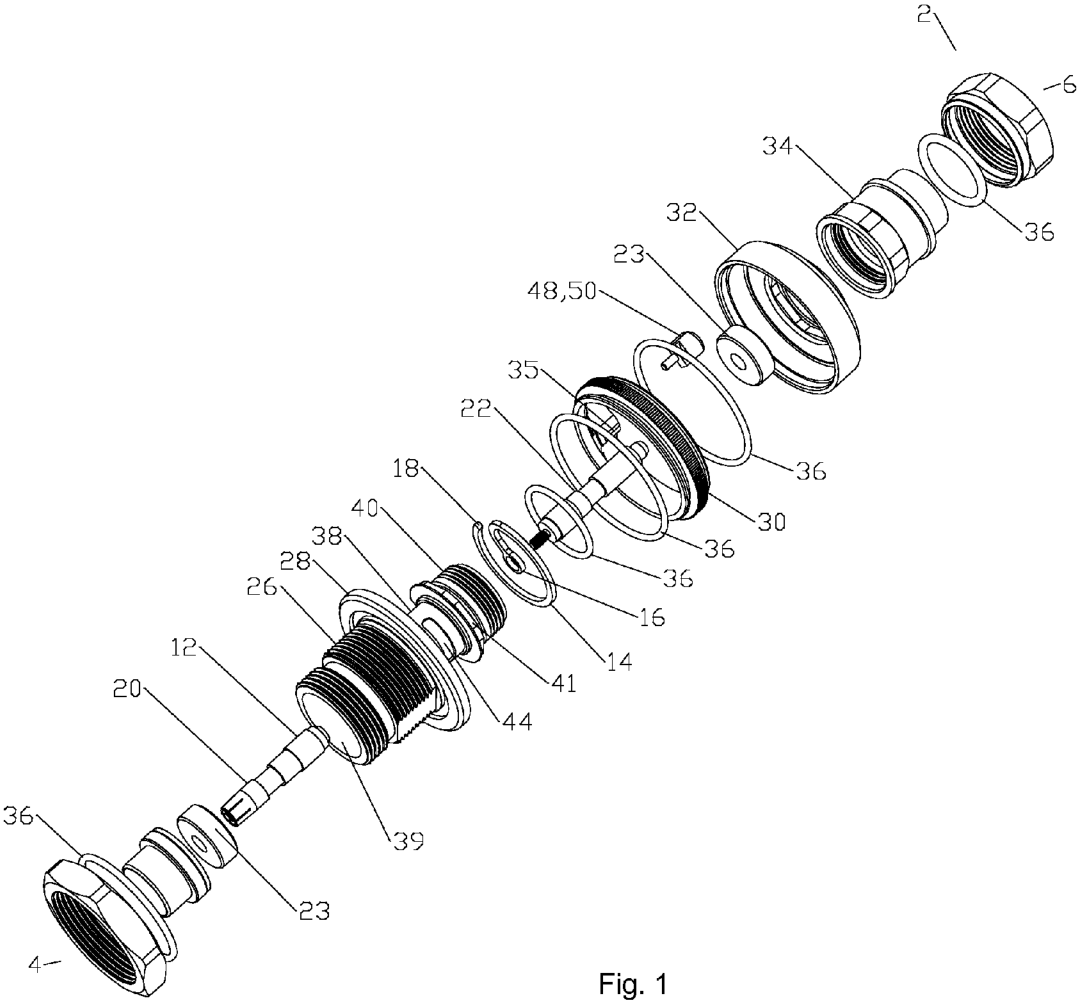
FIG. 1 is a schematic isometric exploded view of an exemplary embodiment of a coaxial surge arrestor tunable via a bracket.
Figure 2:
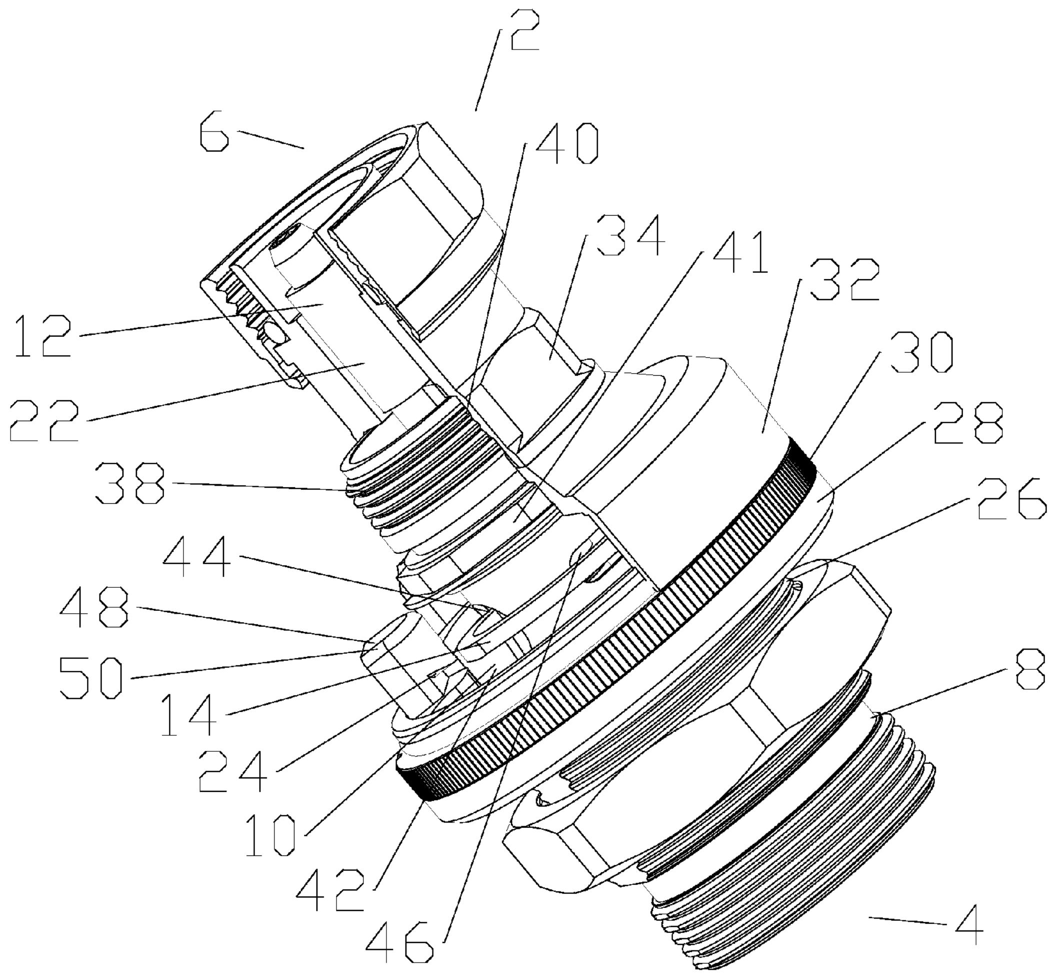
FIG. 2 is a schematic isometric cut-away view of the coaxial surge arrestor of FIG. 1 configured for the lowest frequency.
Figure 3:
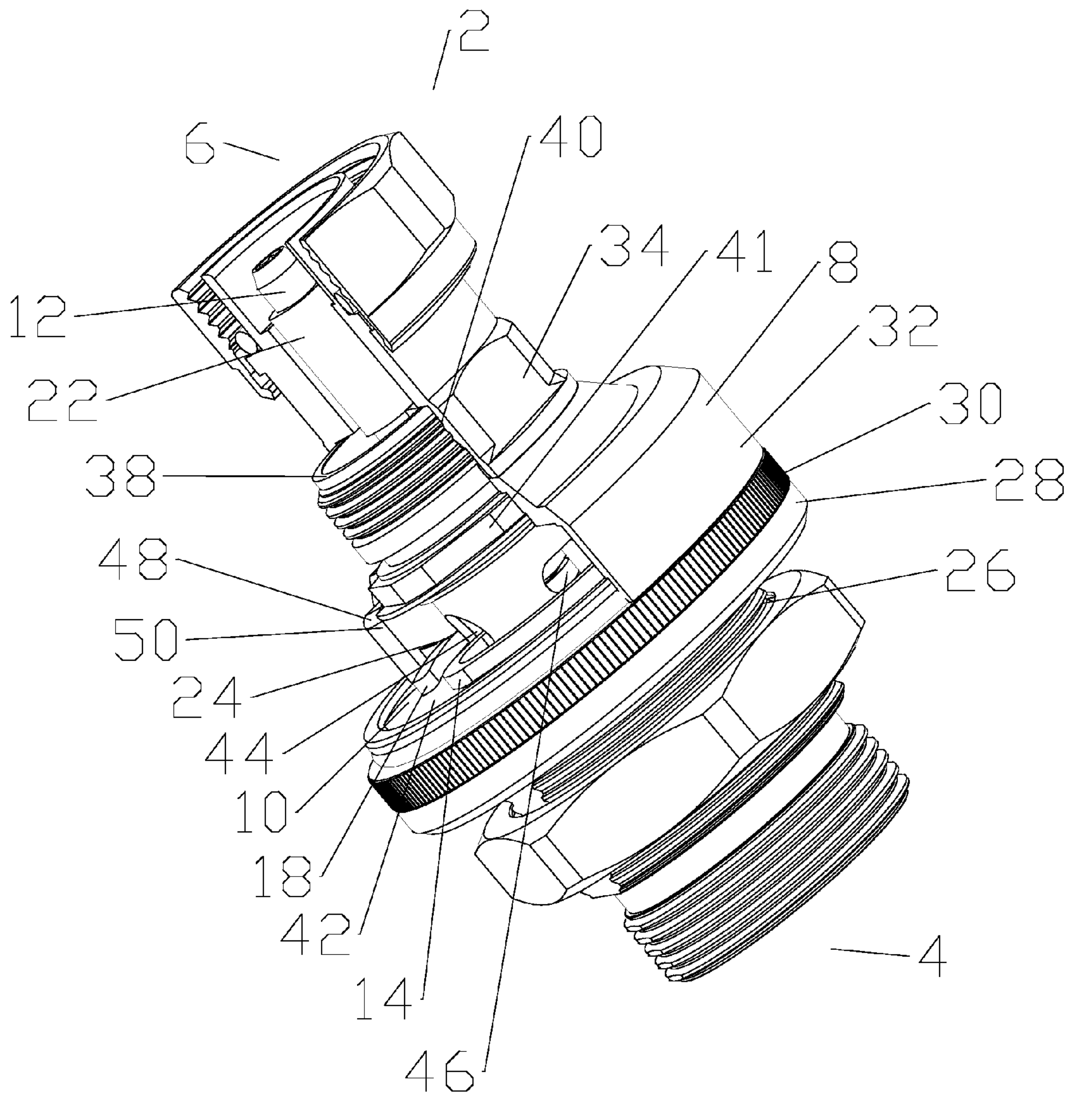
FIG. 3 is a schematic isometric cut-away view of FIG. 2 configured for a higher frequency.

The inventor has recognized that designing, manufacturing and inventorying multiple coaxial surge arrestor models, dimensioned to different operating frequency bands, as opposed to the production of a single, universal model, increases costs for the manufacturer and complicates procurement for the end user. Costs may also be greater for purchasers of coaxial surge arrestors, who are not able to interchangeably use the same surge arrestor for systems operable at different frequency bands, as system configurations evolve.

In a first exemplary embodiment of a user configurable coaxial surge arrestor 2 with a first end 4 and a second end 6, as shown in FIGS. 1-13, the coaxial surge arrestor 2 is provided with an outer body assembly 8. An inner conductor 12 is supported coaxially within a bore 10 of the outer body assembly 8 by one or more insulator(s) 23. A stub 14 is coupled with the inner conductor 12. The stub 14 has an inner end 16 and an outer end 18. The inner end 16 may, for example, be provided with an aperture. The inner conductor 12 may also be provided with a first inner conductor part 20 and a second inner conductor part 22, with the inner end 16 coupled between the first inner conductor part 20 and the second inner conductor part 22. The first inner conductor part 20 and the second inner conductor part 22 may be configured to couple with one another via complementary threads, securely clamping the inner end 16 therebetween.

The outer body assembly 8 may be coupled with the stub 14 at any of a plurality of connection locations 24 along the length of the stub 14, each connection location 24 corresponding to a desired operating frequency band. The connection locations 24 may be located, for example, along a portion of the stub 14 having a substantially uniform radius.

The outer body assembly 8 of the first embodiment may be provided with, between the first end 4 and the second end 6, a connection body 26 with an outward extending housing flange portion 28. A frequency ring 30 seats between housing flange portion 28 and a thrust body 32, and the thrust body 32 is driven through the frequency ring against the housing flange portion 28 by a lock body 34 coupled to the connection body 26 proximate the second end 6, for example via threads 40. O-rings 36 may, for example, be fitted between the frequency ring 30 and housing flange portion 28 and the frequency ring 30 and the thrust body 32 to environmentally seal the outer body assembly 8.

To allow the thrust body 32 to operate as a washer between the lock body 34 and the frequency ring 30 so that tightening the lock body 34 cannot shift the selected frequency ring 30 rotational position and/or to maintain any connection location 24 indicia present on the thrust body 32 in a constant position with respect to the stub 14, an inner diameter of the thrust body 32 at the second end 6 may be keyed to a shoulder 41 of the inner sleeve portion 38 as best shown in FIG. 1.

The connection body 26 may also be provided with an inner sleeve portion 38 serving as an outer conductor sidewall 39 between the first end 4 and the second end 6. The inner sleeve portion 38 passes through an inner diameter of the frequency ring 30 and an inner diameter of the thrust body 32. The thread 40 of the inner sleeve portion 38 opposite the housing flange portion 28 is dimensioned to couple with a corresponding thread 40 of the lock body 34.

Figure 4:
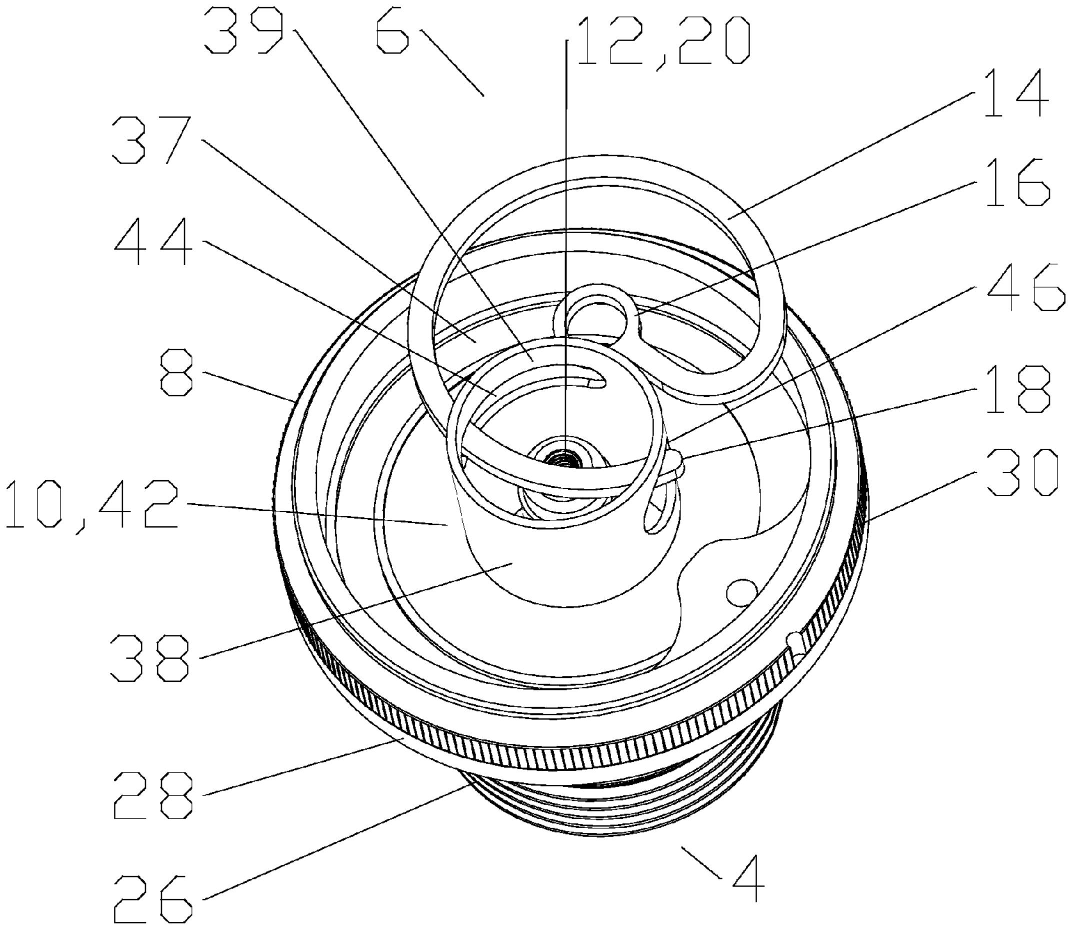
FIG. 4 is a schematic isometric view of the coaxial surge arrestor of FIG. 1 demonstrating initial threading of the stub into the inner sleeve portion during assembly, a portion of the inner sleeve portion being removed for clarity.
Figure 5:
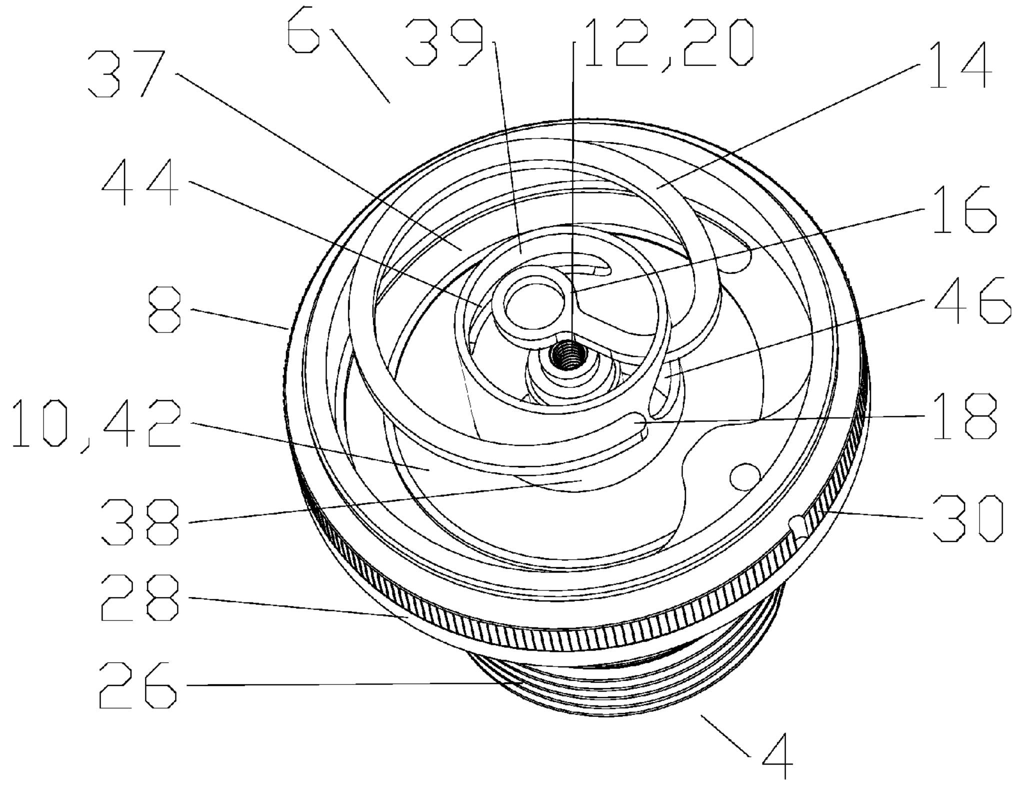
FIG. 5 is a schematic isometric view of the coaxial surge arrestor of FIG. 1 demonstrating intermediate threading of the stub into the inner sleeve portion during assembly, a portion of the inner sleeve portion being removed for clarity.
Figure 6:
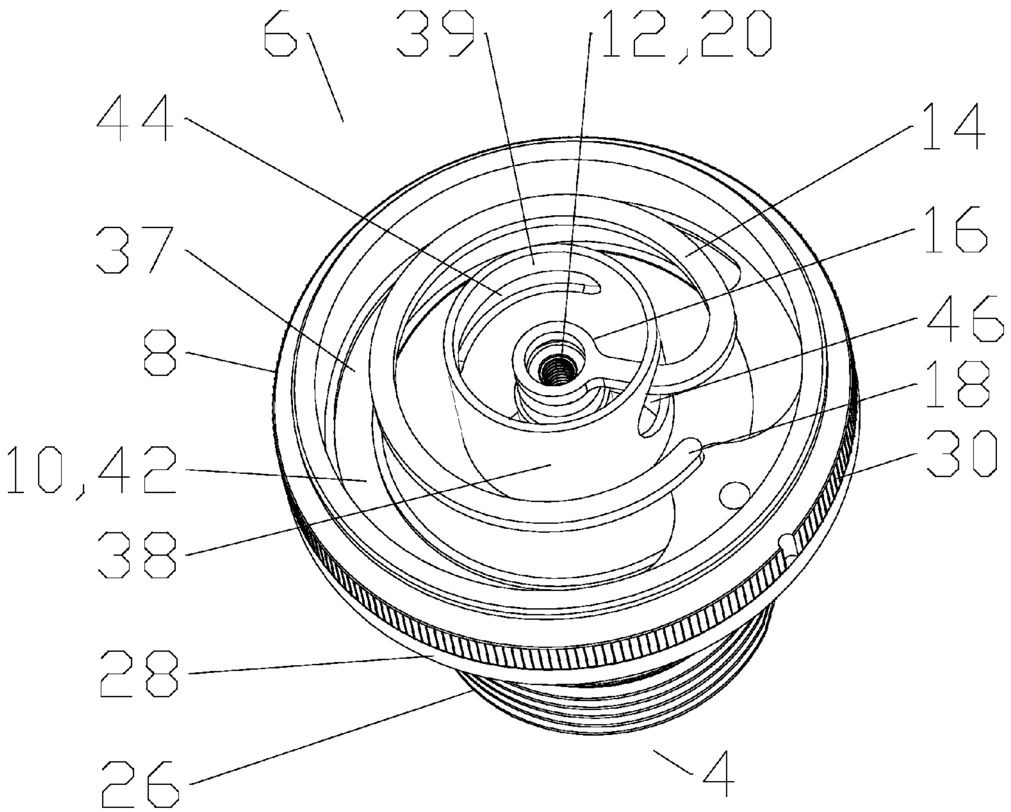
FIG. 6 is a schematic isometric view of the coaxial surge arrestor of FIG. 1 demonstrating final seating of the stub onto the inner conductor during assembly, a portion of the inner sleeve portion being removed for clarity.
Figure 7:
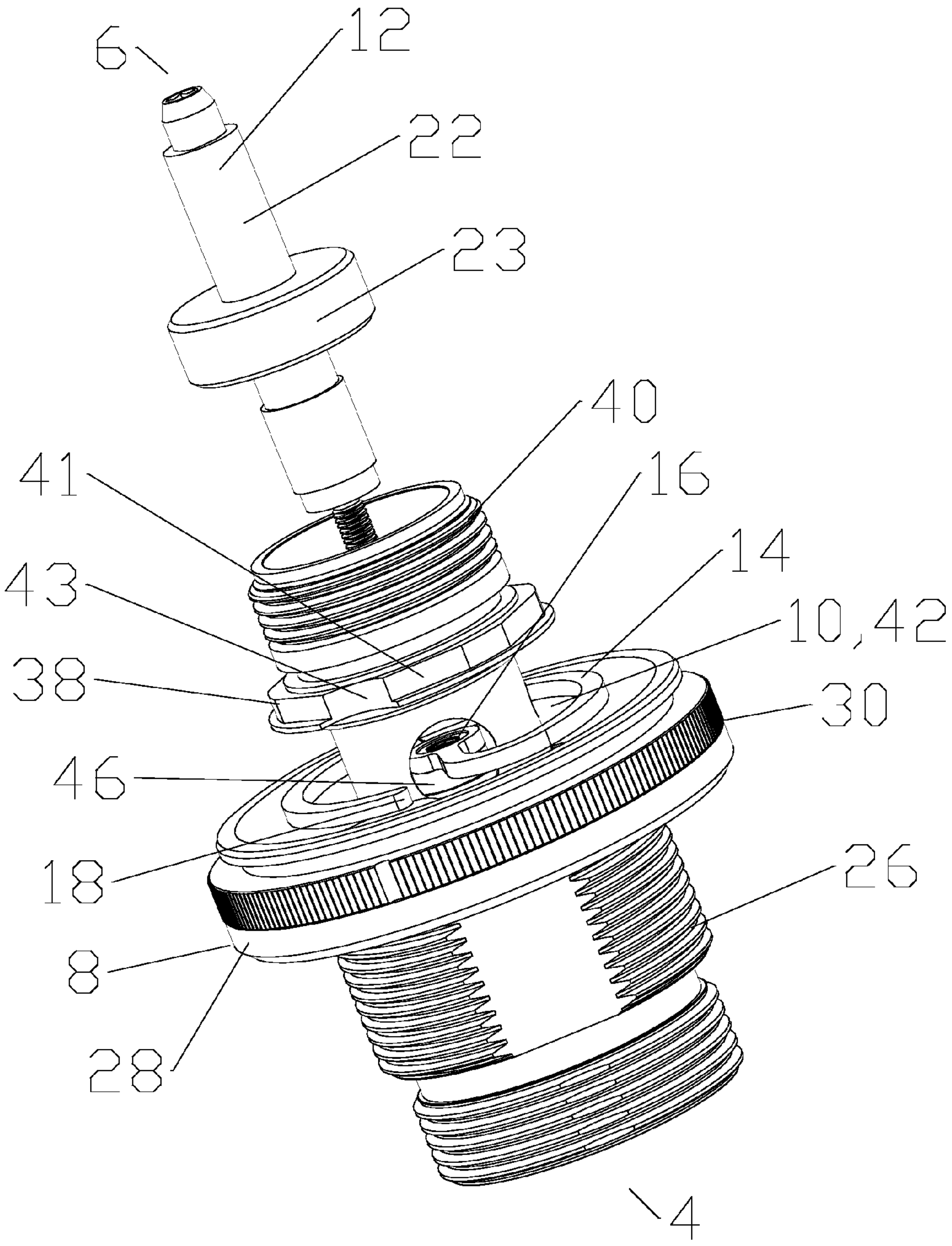
FIG. 7 is a schematic isometric view of the coaxial surge arrestor of FIG. 1, demonstrating insertion of the second inner conductor part to clamp the stub.
Figure 8:
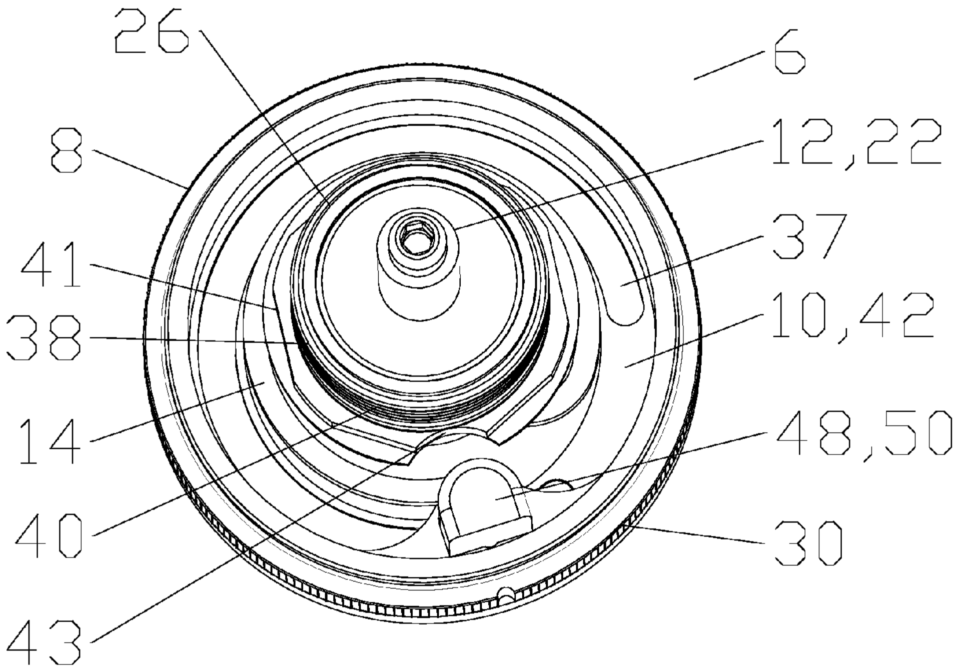
FIG. 8 is a schematic isometric top view of the coaxial surge arrestor of FIG. 1 set to the lowest frequency, wherein the thrust body and lock body are removed for clarity.
Figure 9:
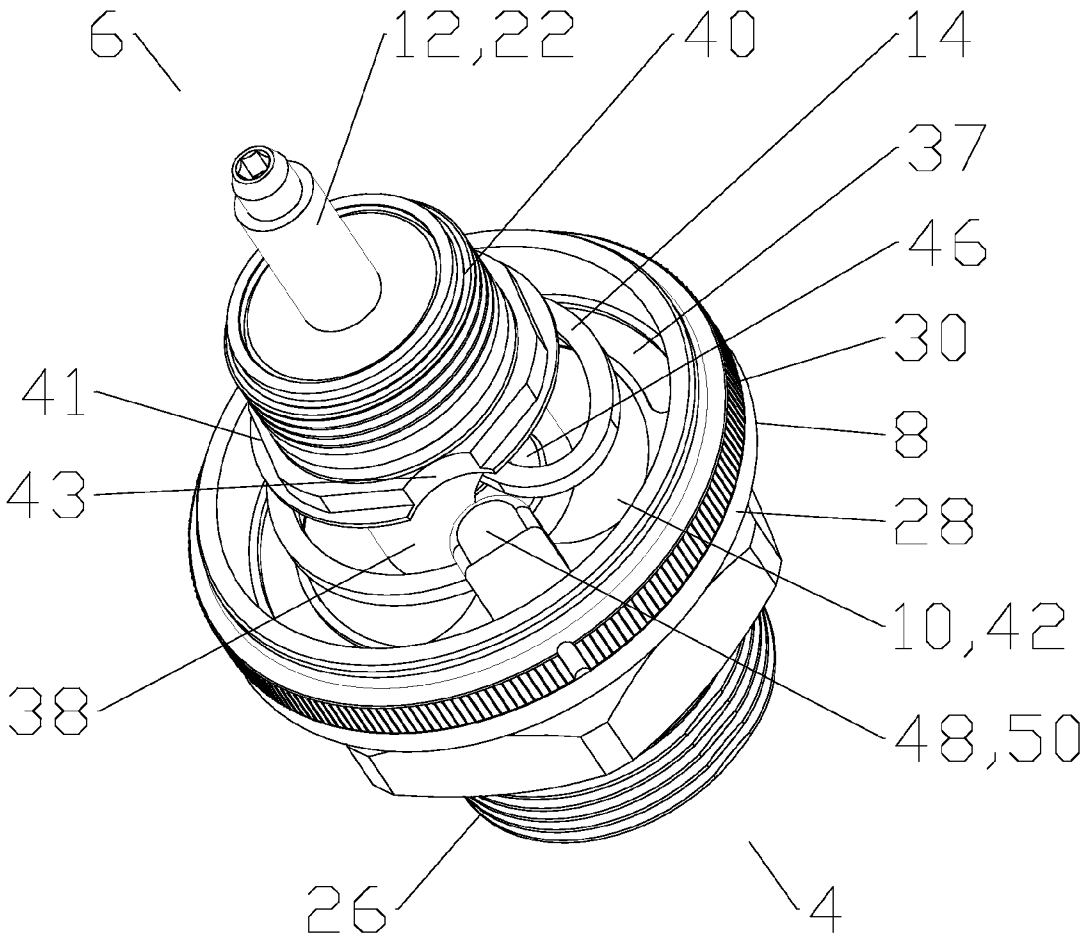
FIG. 9 is a schematic isometric view of FIG. 8, wherein the thrust body and retaining are body removed for clarity.
Figure 10:
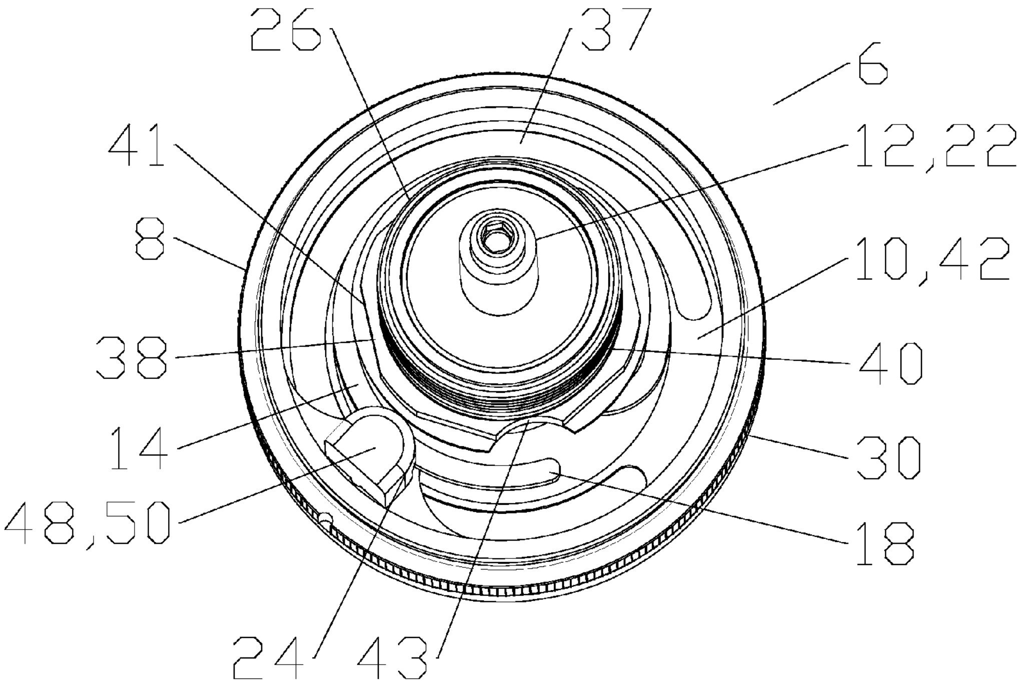
FIG. 10 is a schematic isometric top view of FIG. 8 set to a medium frequency.
Figure 11:
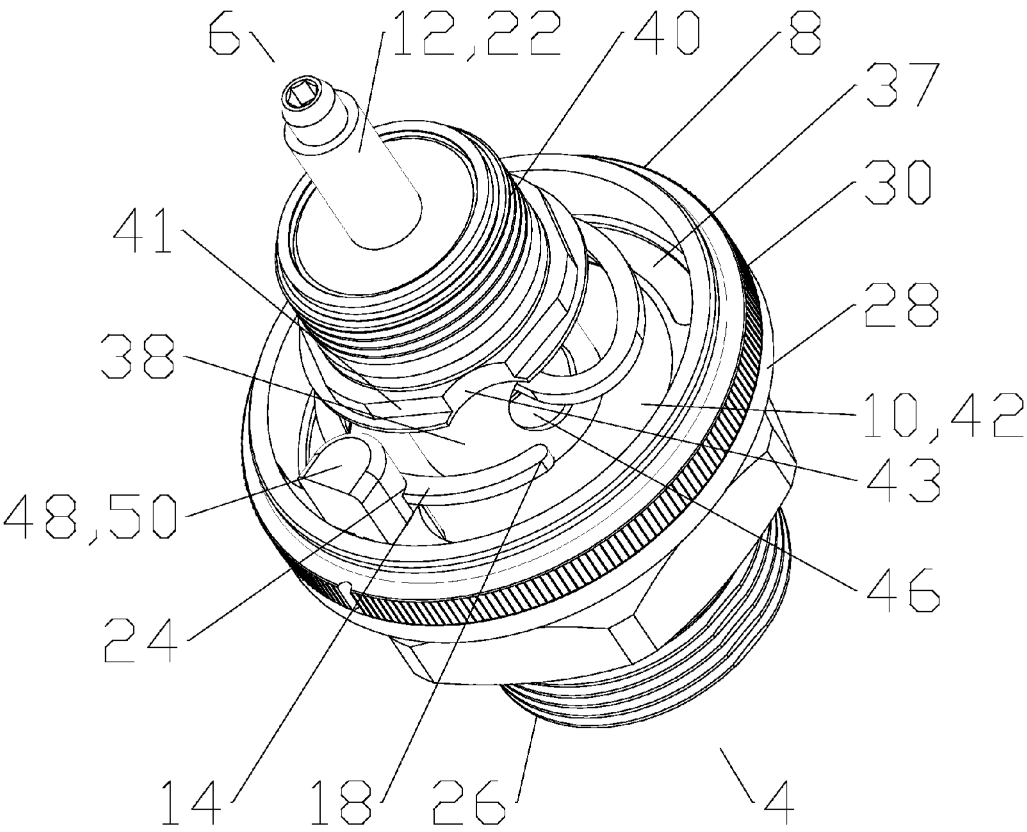
FIG. 11 is a schematic isometric view of FIG. 10.
Figure 12:
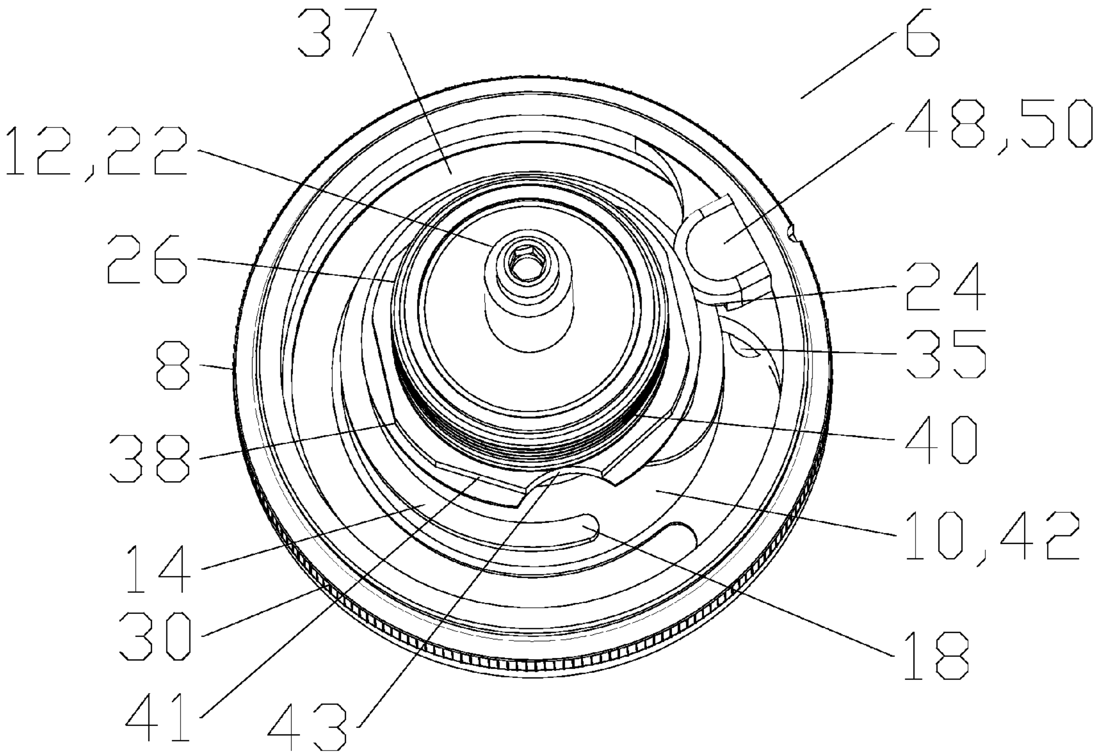
FIG. 12 is a schematic cut-away top view of FIG. 8 set to a higher frequency.

A generally toroidal cavity 42 is formed between an outer diameter of the inner sleeve portion 38 and an inner diameter of the thrust body 32 and/or the frequency ring 30. The stub 14 is coupled with the outer body assembly 8 within the cavity 42, passing through an exit hole 46 of the inner sleeve portion 38. The exit hole 46 is dimensioned in a trade-off between formation of an impedance discontinuity of the outer conductor sidewall 39 and a capacitance generated by the proximity of the exit hole periphery to the stub 14 passing therethrough.

Where a maximum range of connection location(s) 24 and thereby operating frequency range of the resulting device is desired, the stub 14 may be configured with the stub extending around a circumference that ends short of contacting itself. To enable such a stub 14 to be threaded into position with the inner end 16 seated between the first and second inner conductor parts 20, 22 an insertion slot 44 may be provided as best shown in FIGS. 4-6. Thereby the stub 14 may be threaded into position without bending or deformation. Because the insertion slot 44 is only passed during stub assembly, the width of the insertion slot 44 may be significantly smaller than that of the exit hole 46, proximate a thickness of the stub 14, to minimize any impedance discontinuity generated thereby.

The coupling between the outer body assembly 8 and the stub 14 at the desired connection location 24 may be via a clamp 48. The clamp 48 of the first embodiment is, for example, a bracket 50 coupled with the frequency ring 30, clamping the stub 14 to the frequency ring 30 as the thrust body 32 and frequency ring are clamped between the housing flange portion 28 and the lock body 34.

Gas discharge tubes have the electrical characteristics of an open circuit until a breakdown voltage differential across the tube is applied, ionizing gas enclosed within the tube and closing the circuit. Applied to a surge arrestor, a gas discharge tube completes an electrical circuit between the inner conductor 12 and outer body assembly 8, through the stub 14, only when a surge in excess of the selected gas discharge tube ionization voltage occurs. In further embodiments, for example where passage of DC power and/or control signals along the inner conductor 12 is desired, a gas discharge tube may be applied in a series connection with the stub 14, for example by providing a cavity in the bracket 50 to seat a gas discharge tube there within with insulators routing the electrical path from the stub 14 through the gas discharge tube to the outer body assembly 8, only. Gas discharge tubes are known to those skilled in the surge suppression art and therefore are not described in further detail herein. A clamp cut-out 43 in the shoulder 41 allows a bracket 50 of increased dimension to be inserted past the shoulder 41 and then be retained thereby.

The frequency ring 30 is rotatable around a longitudinal axis of the inner conductor 12, thereby selecting the desired connection location 24, for example as shown in FIGS. 8-13. A plurality of pre-defined connection location(s) 24 may be identified with indicia applied to the outer body assembly 8, for example to the housing flange portion 28 or thrust body 32, for ease of user configuration. The axial position of the lock body 34 along the connection body 26 is variable to drive the thrust body 32 and frequency ring 30 against the housing flange portion 28, to rotationally lock the frequency ring 30 at the desired rotation and thereby connection location 24.

Figure 13:
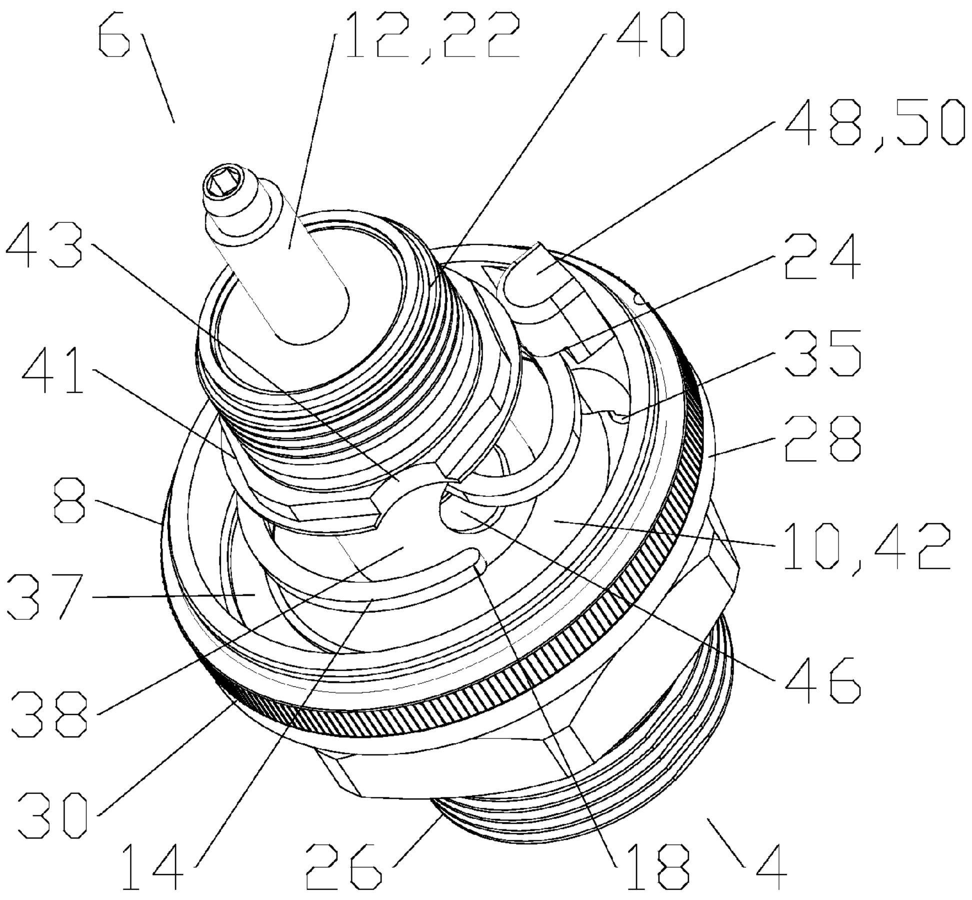
FIG. 13 is a schematic isometric cut-away view of FIG. 12.

The range of frequency ring 30 rotation to select the desired connection location 24 may be limited, for example, by a stop tab 35 of the frequency ring 30 movable within the extent of a stop groove 37 of the housing flange portion 28, as best shown in FIG. 13. Thereby, the frequency ring 30 may not be rotated to a position past the end of the stub 14 or to before a minimum stub 14 location where the stub 14 has not extended outward to the beginning of the portion of the stub 14 having a substantially uniform radius.

Figure 14:
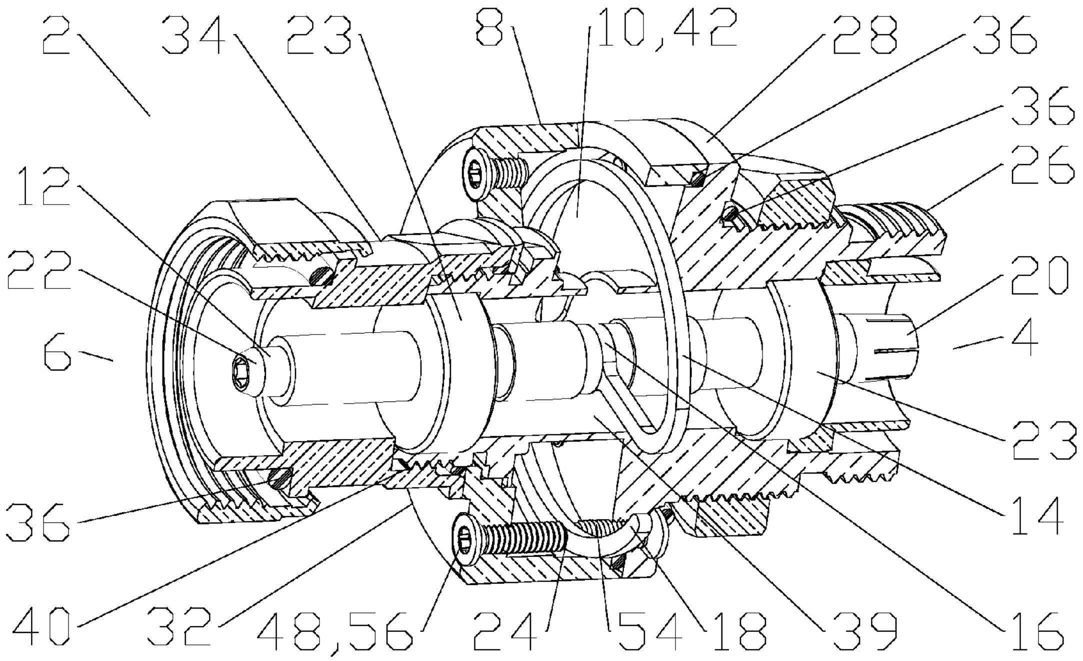
FIG. 14 is a schematic isometric cut-away view of a second exemplary embodiment of a coaxial surge arrestor.
Figure 15:
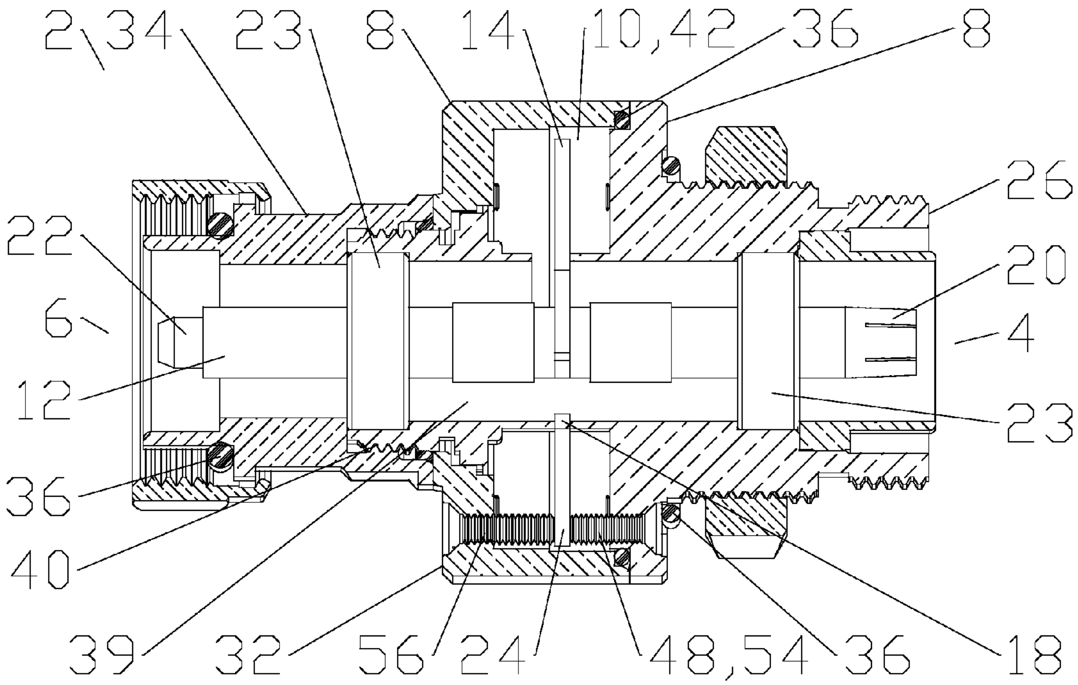
FIG. 15 is a schematic cross-section side view of the coaxial surge arrestor of FIG. 14.
Figure 16:
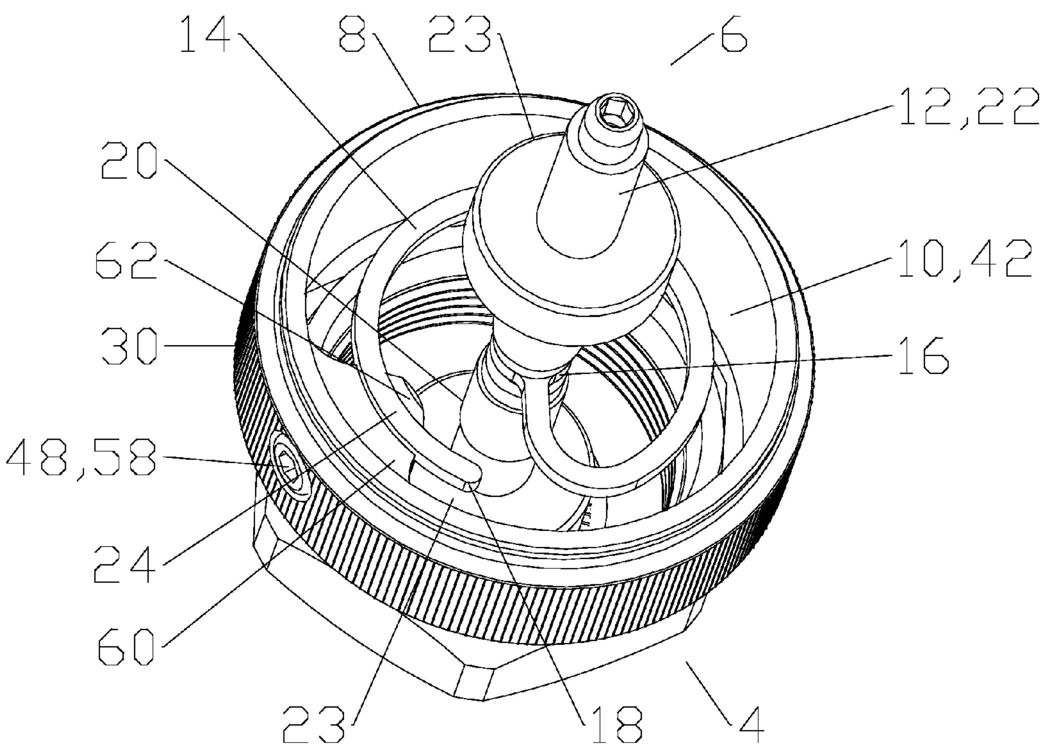
FIG. 16 is a schematic isometric cut-away view of a third exemplary embodiment of a coaxial surge arrestor tunable via a third fastener, adjusted for a medium frequency band.
Figure 17:
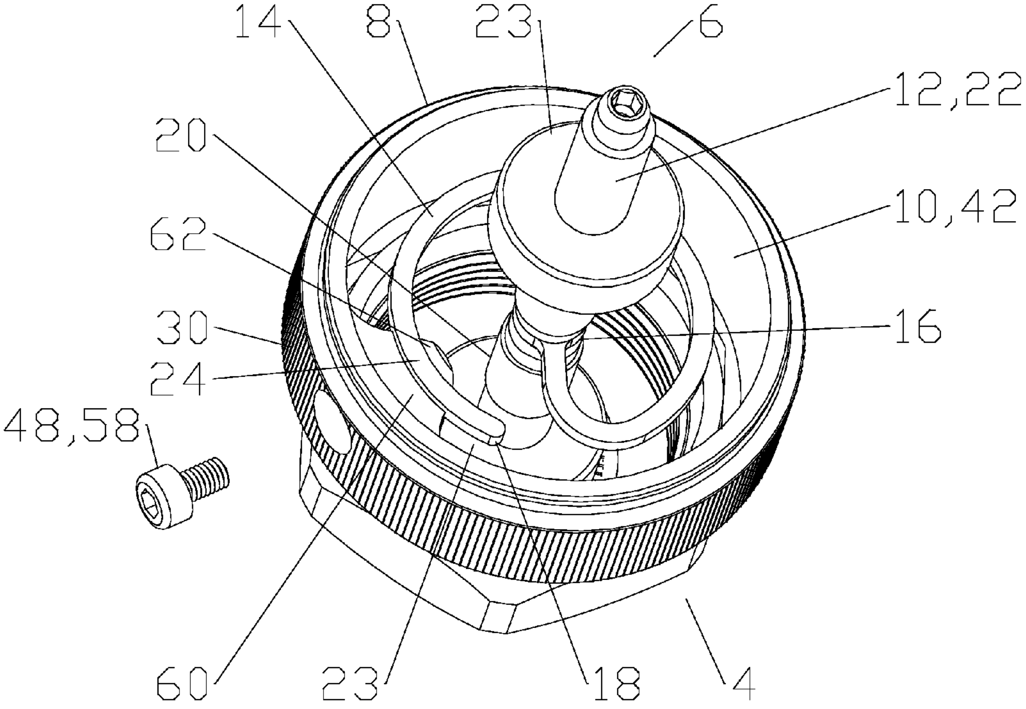
FIG. 17 is a schematic isometric cut-away exploded view of FIG. 16 with the third fastener removed; adjusted for a medium frequency band.
Figure 18:
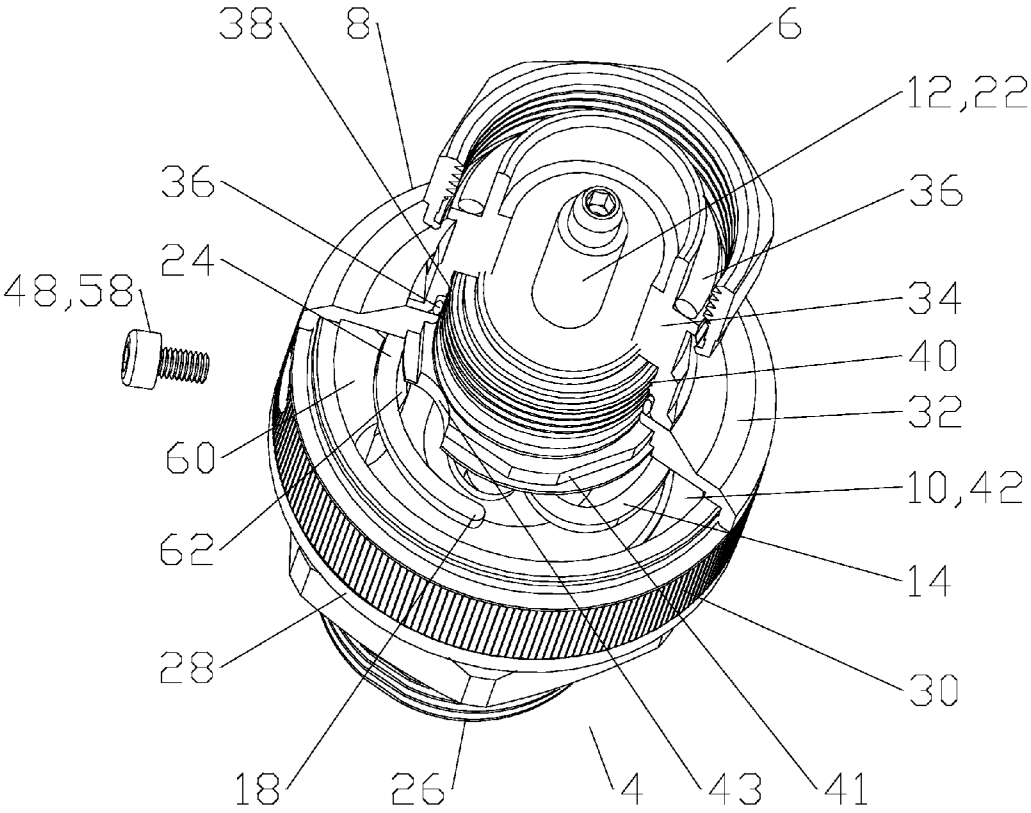
FIG. 18 is a schematic isometric-cut away exploded view of FIG. 16 with the third fastener removed, adjusted for a higher frequency band.
Figure 19:
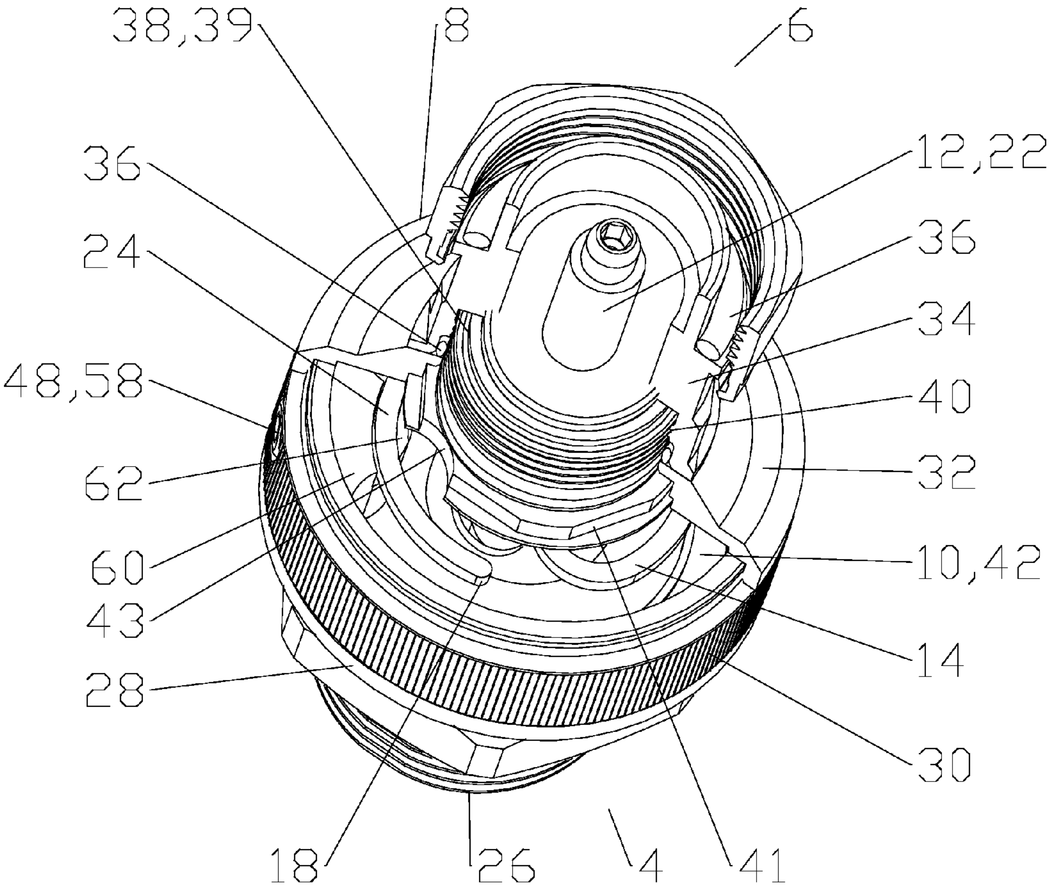
FIG. 19 is a schematic isometric cut away view of FIG. 18; where the third fastener is attached.

In a second exemplary embodiment of a coaxial surge arrestor 2, as shown in FIGS. 14-15, the clamp 48 functionality is demonstrated in a simplified form with a plurality of pre-defined rather than continuously selectable connection location(s) 24. The clamp 48 is formed via a pair of opposing fasteners, with a first fastener 54 extending through the housing flange portion 28 and a second fastener 56 extending through the thrust body 32. The first fastener 54 and second faster 56 penetrate into the cavity 42 from the housing flange portion 28 and the thrust body 32, respectively, to clamp against opposing sides of the stub 14 at a desired contact location 24. As best shown in FIG. 14, alternative contact location(s) 24 may be selected by applying first and second fastener pairs 52, 54 with an extended length at the desired contact location 24, while the unselected contact location 24 uses a pair of shortened fasteners unable to contact the stub 14 to seal the fastener holes provided at the alternative contact location(s) 24.

In a third exemplary embodiment, shown in FIGS. 16-19, the clamp 48 may be formed utilizing a third fastener 58 extending radially inward through the frequency ring 30 to clamp the stub 14 against stop portion 62 of an inward projecting frequency ring flange portion 60 of the frequency ring 30 at a desired contact location 24, depending upon the selected rotation of the frequency ring with respect to the stub 14.

In an exemplary method for assembling the coaxial surge arrestor 2 of the first embodiment, the outer end 18 of the stub 14 is looped through the insertion slot 44 and out of the exit hole 46 of the inner sleeve portion 38. The stub 14 is passed through the inner sleeve portion 38 until the loop of the inner end 16 of the stub 14 fits over the previously installed first inner conductor part 20, held coaxial by an insulator 23. The second inner conductor part 22 is installed within an inner diameter of the inner sleeve portion 38, connecting to an opposing side of the inner end 16 of the stub 14, held coaxial by an insulator 23. The frequency ring 30 is passed over the outer diameter of the inner sleeve portion 38, a first end of frequency ring 30 contacting the housing flange portion 28 of the connection body 26. The clamp 48 is coupled to the frequency ring 30, for example, by inserting a protrusion of the clamp 48 into an aperture of the frequency ring 30. The thrust body 32 is passed over the outer diameter of the inner sleeve portion 38, a first end of the thrust body 32 contacting a second end of the frequency ring 30. The lock body 34 is threadably coupled to the inner sleeve portion 38, clamping the frequency ring 30, stub 14, clamp 48 and thrust body 32 between the housing flange portion 28 and the lock body 34. O-rings 36 may be placed between the frequency ring 30 and housing flange portion 28 and the frequency ring 30 and the thrust body 32 to environmentally seal the coaxial surge arrestor 2.

In an exemplary method for configuring the operating frequency of the coaxial surge arrestor 2 of the first embodiment, the lock body 34 is rotated around the inner conductor 12 to loosen the clamping force upon the frequency ring 30. The frequency ring 30 is then rotated to any of the setting points, placing the clamp 48 in contact with the stub 14 at a connection location 24 corresponding to the selected setting point. The frequency ring 30 is fixed at the selected setting point, securing the position of the clamp 48 at the selected connection location 24, by threading the lock body 34 towards the housing flange portion 28 to increase the clamping force upon the frequency ring 30.

In an exemplary method for assembling the coaxial surge arrestor 2 of the second embodiment, the outer end of the stub 14 is looped through the insertion slot 44 and out of the exit hole 46 of the inner sleeve portion 38. The stub 14 is passed through the inner sleeve portion 38 until the inner end 16 fits over the previously installed first inner conductor part 20, held coaxial by an insulator 23. The second inner conductor part 22 is installed within an inner diameter of the inner sleeve portion 38, connecting to an opposing side of the inner end 16, held coaxial by an insulator 23. The lock body 34 is threadably coupled to the inner sleeve portion 38, rotatably fixing the thrust body 32 between the lock body 34 and the housing flange portion 28. O-rings 36 may be placed between the housing flange portion 28 and thrust body 32 to environmentally seal the coaxial surge arrestor 2.

In an exemplary method for configuring the coaxial surge arrestor 2 of the second embodiment, the first fastener 54 is inserted into any of the apertures of the housing flange portion 28, thereby coupling one of the connection locations 24 with the housing flange portion 28. A second fastener 56 is inserted into a corresponding aperture of the thrust body 32, thereby coupling a connection location 24 opposite the first fastener 54 to the lock body 34. The stub 14 is thus coupled with the outer body assembly 8, clamped between the first fastener 54 and the second fastener 56.

In an exemplary method for assembling the coaxial surge arrestor 2 of the third embodiment, the outer end 18 of the stub 14 is looped through the insertion slot 44 and out of the exit hole 46 of the inner sleeve portion 38. The stub 14 is passed through the inner sleeve portion 38 until the inner end 16 of the stub 14 fits over the previously installed first inner conductor part 20, held coaxial by an insulator 23. The second inner conductor part 22 is installed within an inner diameter of the inner sleeve portion 38, connecting to an opposing side of the inner end 16 of the stub 14, held coaxial by an insulator 23. The frequency ring 30 is passed over the outer diameter of the inner sleeve portion 38, a first end of frequency ring 30 contacting the housing flange portion 28 of the connection body 26. The thrust body 32 is passed over the outer diameter of the inner sleeve portion 38, a first end of the thrust body 32 contacting a second end of the frequency ring 30. The lock body 34 is threadably coupled to the inner sleeve portion 38, clamping the frequency ring 30 and thrust body 32 between the housing flange portion 28 and the lock body 34. O-rings 36 may be placed between the frequency ring 30 and housing flange portion 28 and the frequency ring 30 and the thrust body 32 to environmentally seal the coaxial surge arrestor 2.

The clamp 48 is coupled to the frequency ring 30 and a connection point 24 of the stub 14, for example, by inserting a third fastener 58 into an aperture though an outer diameter of the frequency ring 30. Inserting the third fastener 58 into an aperture of the frequency ring 30 clamps the stub between the third fastener 58 and a stop portion 62 of a frequency ring flange portion 60 of the frequency ring 30.

In an exemplary method for configuring the coaxial surge arrestor 2 of the third exemplary embodiment, the lock body 34 is threaded towards the second end to loosen the clamping force upon the frequency ring 30. The frequency ring 30 is then rotated to any of a plurality of setting points. The frequency ring 30 is fixed at the selected setting point, securing the position of an aperture of the frequency ring 30 corresponding to a selected connection location 24, by rotating the lock body 34 to increase the clamping force upon the frequency ring 30. Inserting the third fastener 58 into the aperture of the frequency ring 30, for example, by threadably inserting the third fastener 58 into the aperture of the frequency ring 30, clamps the stub 14 at the selected connection location 24 between the third fastener 58 and the stop portion 62.

Figure 20:
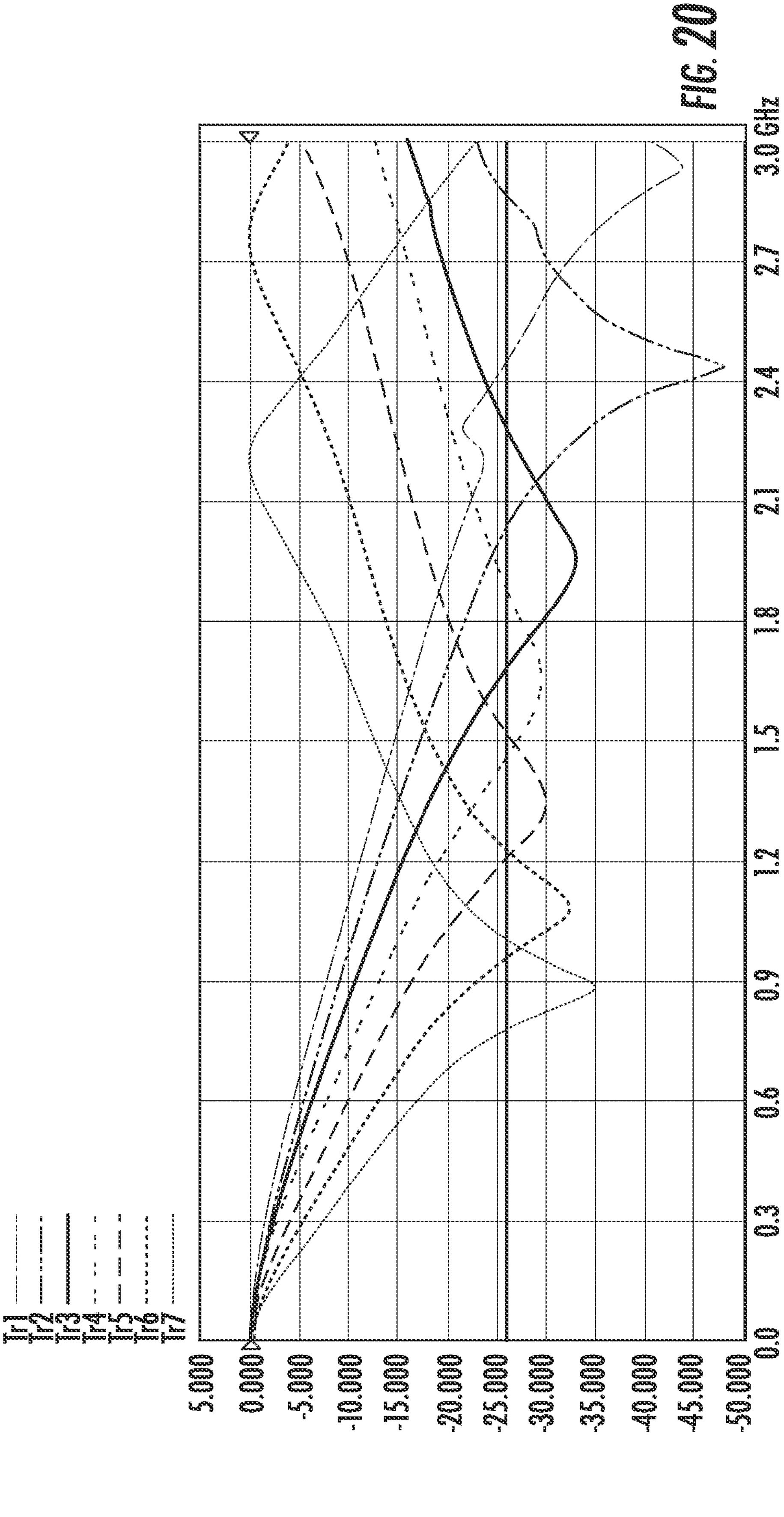
FIG. 20 is a chart of measured electrical performance of a single tunable surge arrestor variously configured for several overlapping frequency band settings, demonstrating configurability of the arrestor for operating frequencies between 806 MHz and 3 GHz.

As demonstrated in FIG. 20, a tunable surge arrestor according to the first exemplary embodiment may be configured for operation between 806 MHz. and 3 GHz. One skilled in the art will appreciate that operation of the arrestor when tuned for any of the seven overlapping exemplary frequency bands demonstrated results in 26 dB down or better performance, resulting in at least 95% of the signal power across each frequency band being transmitted through the arrestor during operation.

One skilled in the art will also appreciate that the selectable connection location functionality of the tunable coaxial surge arrestor may eliminate the need for designing, manufacturing and inventorying of multiple frequency band specific surge arrestor configurations, which may both significantly reduce cost of goods and simplify model specification requirements during procurement by the user.

Table of Parts

| | |
|---|---|
| 2 | coaxial surge arrestor |
| 4 | first end |
| 6 | second end |
| 8 | outer body assembly |
| 10 | bore |
| 12 | inner conductor |
| 14 | stub |
| 16 | inner end |
| 18 | outer end |

-continued

| Table of Parts | |
|---|---|
| 20 | first inner conductor part |
| 22 | second inner conductor part |
| 23 | insulator |
| 24 | connection location |
| 26 | connection body |
| 28 | housing flange portion |
| 30 | frequency ring |
| 32 | thrust body |
| 34 | lock body |
| 35 | stop tab |
| 36 | O-ring |
| 37 | stop groove |
| 38 | inner sleeve portion |
| 39 | outer conductor sidewall |
| 40 | thread |
| 41 | shoulder |
| 42 | cavity |
| 43 | clamp cut-out |
| 44 | insertion slot |
| 46 | exit hole |
| 48 | clamp |
| 50 | bracket |
| 54 | first fastener |
| 56 | second fastener |
| 58 | third fastener |
| 60 | frequency ring flange portion |
| 62 | stop portion |

Where in the foregoing description reference has been made to ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. A coaxial surge arrestor with a first end and a second end, comprising:

an outer body provided with a bore; the outer body comprising, between the first end and the second end:

a connection body provided with a housing flange portion coupled with a thrust body via a frequency ring of the outer body;

the thrust body coupled with a lock body;

an inner sleeve portion of the connection body passes through an inner diameter of the frequency ring and an inner diameter of the thrust body;

the lock body coupled with the inner sleeve portion; and the lock body axial position along the connection body variable to drive the thrust body and frequency ring against the housing flange portion, to rotationally lock the frequency ring;

an inner conductor within the bore;

an inner end of a stub coupled with the inner conductor; and the stub coupled with the outer body at one of a plurality of connection locations along a length of the stub.

2. The coaxial surge arrestor of claim 1, wherein the connection locations are along a portion of the stub having a substantially uniform radius.

3. The coaxial surge arrestor of claim 1, wherein the inner conductor comprises a first inner conductor part coupled with a second inner conductor part; and the inner end of the stub is clamped between the first inner conductor part and the second inner conductor part.

4. The coaxial surge arrestor of claim 1, wherein the coupling between the outer body and the stub is via a clamp.

5. The coaxial surge arrestor of claim 4, wherein the clamp is a pair of opposing fasteners;

a first fastener coupling one of the connection locations to the housing flange portion; and a second fastener coupling a connection location opposite the first fastener to the thrust body.

6. The coaxial surge arrestor of claim 1, wherein the frequency ring is rotatable around a longitudinal axis of the inner conductor; and rotation of the frequency ring selects the connection location at which the stub is coupled to the outer body.

7. The coaxial surge arrestor of claim 1, wherein the lock body is longitudinally adjustable along a longitudinal axis of the inner conductor to clamp the stub between the frequency ring and the clamp.

8. The coaxial surge arrestor of claim 1, further including an inner sleeve portion of the connection body;

a cavity formed between an outer diameter of the inner sleeve portion and an inner diameter of the thrust body and an inner diameter of the frequency ring; and the stub coupled with the outer body within the cavity.

9. The coaxial surge arrestor of claim 8, wherein the inner sleeve portion provides an outer conductor sidewall between the first end and the second end.

10. The coaxial surge arrestor of claim 8, wherein the stub passes through an exit hole of the inner sleeve portion.

11. The coaxial surge arrestor of claim 4, wherein the clamp is a third fastener;

the stub coupled between the third fastener and a stop portion of a frequency ring flange portion of the frequency ring.

12. The coaxial surge arrestor of claim 11, wherein the third fastener is a screw coupled with the frequency ring via an aperture of the frequency ring.

13. The coaxial surge arrestor of claim 4, wherein the clamp is a bracket coupled with the frequency ring;

the clamp clamping the stub to the frequency ring;

the clamp clamped between the frequency ring and the thrust body.

14. A method for tuning a coaxial surge arrestor, comprising the steps of:

coupling a stub with an outer body of a coaxial surge arrestor at one of a plurality of connection locations along the length of the stub by placing a first fastener into any of a plurality of apertures in a housing flange portion of a connection body of the outer body, thereby coupling one of the connection locations with the housing flange Portion; and placing a second fastener into one of a plurality of apertures in a lock body of the outer body, thereby coupling a connection location opposite the first opposing fastener to the lock body;

the outer body provided with a bore;

an inner conductor within the bore; and an inner end of the stub coupled with the inner conductor.

* * * * *